United States Patent

Rosenbauer

[15] 3,649,236
[45] Mar. 14, 1972

[54] MANUFACTURE OF MULTIFOCAL OPHTHALMIC LENS MOLDS

[72] Inventor: Charles H. Rosenbauer, Irondequoit, N.Y.
[73] Assignee: Bausch & Lomb Incorporated, Rochester, N.Y.
[22] Filed: Mar. 5, 1970
[21] Appl. No.: 16,664

Related U.S. Application Data

[63] Continuation-in-part of Ser. No. 661,608, Aug. 18, 1967, abandoned, and a continuation-in-part of Ser. No. 820,582, Apr. 30, 1969, abandoned.

[52] U.S. Cl. ...........................................65/31, 65/37, 65/38, 65/374, 264/1
[51] Int. Cl. .........................C03c 15/00, C03b 11/08, C03b
[58] Field of Search ......................65/37, 38, 374, 31; 264/1

[56] References Cited

UNITED STATES PATENTS

| 2,049,094 | 7/1936 | Tillyer | 65/38 |
| 2,890,486 | 6/1959 | Crandon | 65/37 X |
| 2,936,674 | 5/1960 | Beasley | 65/38 |
| 3,297,422 | 1/1967 | Emerson et al. | 65/37 X |
| 3,460,928 | 8/1969 | Casko | 65/38 X |

Primary Examiner—Frank W. Miga
Attorney—Frank C. Parker and Bernard D. Bogdon

[57] ABSTRACT

A method of manufacture of molds for casting finished multifocal plastic ophthalmic lenses of the type wherein the corrections for the near field of vision are provided on the convex surface of the finished lens.

9 Claims, 31 Drawing Figures

PATENTED MAR 14 1972 3,649,236

CHARLES H. ROSENBAUER
INVENTOR.

BY

ATTORNEY

CHARLES H. ROSENBAUER
INVENTOR.

BY Frank C. Parker

ATTORNEY

MANUFACTURE OF MULTIFOCAL OPHTHALMIC LENS MOLDS

CROSS-REFERENCES TO RELATED APPLICATION

This application is a continuation-in-part of my copending application, Ser. No. 661,608, filed Aug. 18, 1967 now abandoned and a further continuation-in-part of my copending application, Ser. No. 820,582, filed Apr. 30, 1969 now abandoned.

BACKGROUND OF THE INVENTION

1. Field of the Invention

This invention relates to improved methods of making molds for casting multifocal ophthalmic lenses and to improved molds resulting from the aforesaid method.

2. Brief Description of the Prior Art

The use of plastic ophthalmic lenses has been increasing because plastic lens blanks can be cast with one or both surfaces finished to the desired curvature. However, plastic lenses are usually cast with only one finished surface and the prescription curve is subsequently applied to the other surface.

Cast plastic lenses are particularly advantageous for multifocal use where different curvatures are applied to one surface of the lens. Casting of multifocal lenses in properly manufactured molds can yield lenses of precise curvature and configuration. However, in the past, production of casting molds has been difficult because of the multiple curves and configurations and the close dimensional control required.

One method of making molds for casting plastic ophthalmic lenses is disclosed in U.S. Pat. No. 3,297,422, issued to Stanley A. Emerson and George A. Beasley on Jan. 10, 1967. However, practice of the invention disclosed in the Emerson et al., patent presents serious difficulties. One problem exists in the integrity of the separation line which extends between different focal surfaces. It has been my experience that when grinding and polishing glass molds it is extremely difficult to grind over a sharp edge or corner without chipping or faulting the area being ground. It is necessary to maintain a sharp segment line between the distance and near vision segments of a multifocal lens and any chips, cracks or imperfections in the mold will produce a defective lens.

In addition, in the Emerson et al., patent the disclosed method of controlling the outline size and shape of the near field of vision complementary curvature on the lens mold necessitates precise and generally time consuming control techniques, particularly during the grinding operation of the surface defining a curvature complementary to the curvature of the distance field of vision of a lens. When the complementary distance curvature is being ground, grinding transpires immediately juxtaposed the surface of the mold defining the complementary near curvature thereby establishing at least part of the boundary between the surfaces having the complementary near and distance curvatures and specifically, all of the outline of the complementary near surface except for the separation line. According to this practice, the particular size and shape of the complementary near curvature is difficult to generate because in that phase of the mold-making operation no specific visible finite mark or indicator is available as a control point or level at which the grinding can be halted, presenting a particularly tedious hand grinding operation. A hand grinding operation is usually necessary because of the generally uncontrollable multitude of independent variables including the mold thickness, the fused segment thickness and the wear of the grinding tool.

SUMMARY OF THE INVENTION

To eliminate the above-described problems and to, in general, facilitate the manufacture of high-quality molds, I have devised a method to maintain the integrity of the parting line between the distance and near vision surfaces of the mold by adhering, for example, by fusing a fused segment forming, for example, a circular disc comprising two or more sections fused together to a concave surface of a glass mold. The segment comprises either a first section comprising generally less than a half circle of glass similar in composition to the glass of the mold blank and a second section of glass comprising generally a section to complete a full circle with the first which is capable of being etched away without attacking the mold or a two-part segment comprising an outer segment section formed of a glass similar in composition to the glass of the mold blank and an inner segment section surrounded by the outer section formed of a glass which is etchable.

After fusing, the method comprises the steps of grinding and polishing the mold including the fused segment to a predetermined complementary distance curvature and then etching away either the selected second section or inner section of the segment thereby producing a finished lens mold with a prescribed near vision cavity. As a result of this new and novel technique, plastic lens molds with a sharp segment line can be produced with a minimum of difficulty in grinding.

For precisely controlling the outline shape and size of the mold surface defining the complementary near curvature, without the difficulties experienced following the prior art methods, it is preferred that the fusible segment comprise inner and outer segment sections as hereinbefore described. The inner section is formed in a preselected shape and size and the outer segment section is formed to mate with it about its lateral periphery. It should be appreciated that any preselected shape is attainable even without using an etchable inner segment section provided the surrounding or outer segment section is formed to define an opening of selected outline shape and size.

The segment comprising, either the outer and inner segment sections, or only the outer segment is adhered, for example, by fusing, to the concave surface on the mold defining the complementary near curvature, as hereinbefore described. Once the last-mentioned step is accomplished the total boundary of the complementary near surface on the mold blank has been defined and further, has been defined totally independent of any grinding operation to follow. The subsequent grinding and polishing operations form the mold surface having a curvature complementary to the curvature of the distance field of vision of the lens and bring, as desired, the complementary near and distance surfaces of the mold relatively close together. Care is taken, however, not to merge or have the complementary near and distance surfaces intersect at more than a single point, in order not to distort the preselected outline for the mold surface having the curvature complementary to the curvature for the near field of vision of the lens.

DESCRIPTION OF PREFERRED EMBODIMENTS

Figure 1:
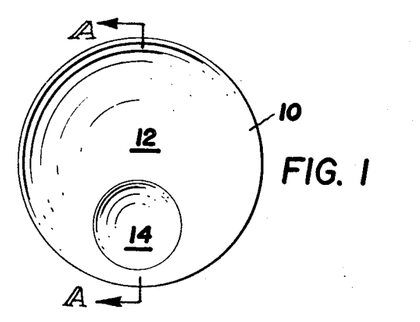
FIG. 1 is a plan view of the concave half of a lens mold showing a recessed surface having a curvature complementary to the near vision curvature of a lens.
Figure 2:
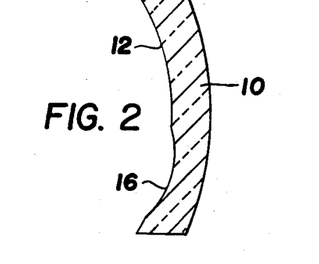
FIG. 2 is a cross-sectional view of the lens mold along the plane of line A—A of FIG. 1 showing the complementary near vision curvature.
Figure 3:
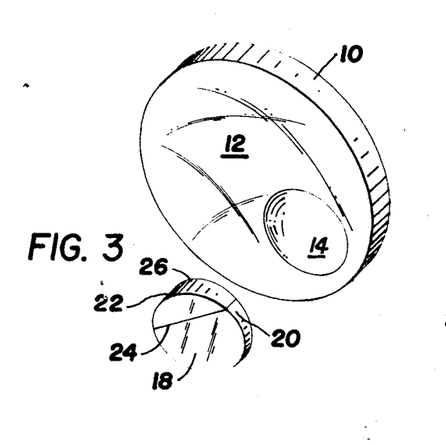
FIG. 3 is a perspective view of the lens mold and one type of fused two part segment prior to fusion of the two part segment to the mold.
Figure 3A:
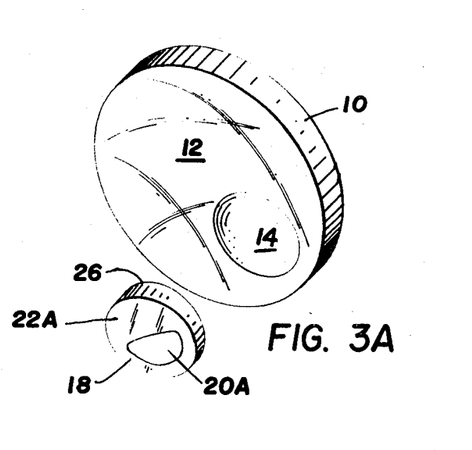
FIG. 3A is a perspective view of the lens mold and another type of fused two part segment prior to fusion, the fused two part segment having an inner segment of a shape normally referred to as Panoptic.

A concave mold half for molding a plastic multifocal lens is shown generally by numeral 10 in FIG. 1. A cavity 14 of selected curvature 16, as best seen in FIG. 2, is generated in surface 12 to provide the required near vision correction, by grinding and polishing, in the mold half 10 at the proper position in order to provide precise location of the near vision correction in the finished lens. Concurrently with preparation of the mold half a segment shown generally as 18 in FIG. 3 or 3A is prepared. This segment 18, as viewed in FIG. 3, is composed of a bottom portion 20 of a glass composition capable of being etched without attacking the glass used for the mold 10, as will be hereinafter more fully described. The bottom portion 20 of the segment 18 is fused to a top portion 22 of the segment 18 along a surface 24. It will be appreciated that the surface 24 may be a plane or curved surface. In FIG. 3A the two part segment 18 comprises an outer portion 22A and an inner portion 20A which is of any desired shape (the shape illustrated being commonly referred to as Panoptic) and which is fused within the outer portion 22A. The top portion 22 or outer portion 22A of the segments are of a glass composition preferably identical with that of the mold half 10.

Figure 4:
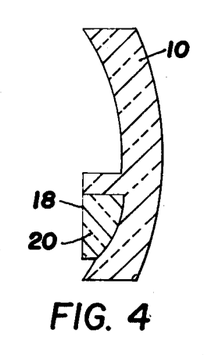
FIG. 4 is a cross-sectional view of the lens mold and either the first or second segment after fusion.

After fusion of the two parts of the segment 18, as viewed in FIG. 3, the back surface 26 of the fused segment 18 is ground and polished to a curvature substantially identical with that of the surface 14 provided in the mold 10. Generally, the convex segment surface is not ground to define a curvature which is exactly complementary to the substantially complementary near surface on the lens mold because of manufacturing problems involving captured air bubbles and improper fusion when the segment is adhered to the mold blank. The selected radius of the ground convex surface is generally less than the radius of the exact complementary curvature to preclude the mentioned problems. The ground and polished segment 18 is then fused to mold 10 as shown in FIG. 4.

Figure 5:
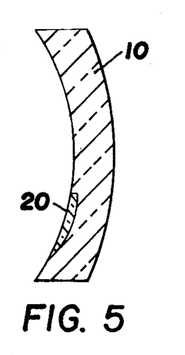
FIG. 5 is a cross-sectional view of the lens mold of FIG. 4 after grinding and polishing of a surface defining a curvature complementary to a distance vision curvature of the lens.
Figures 6, 7:
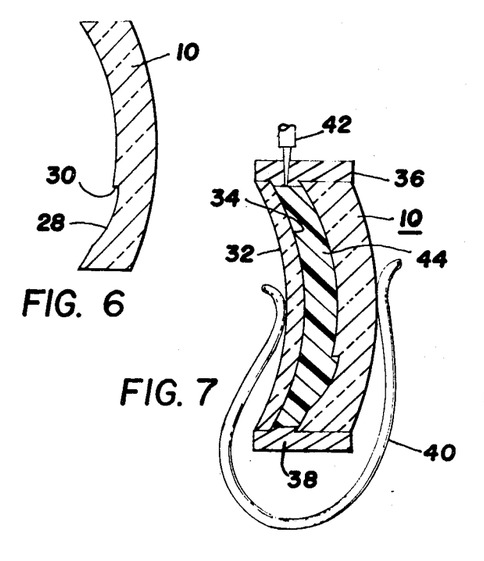
FIG. 6 is a cross-sectional view of the lens mold of FIG. 5 after etching.
FIG. 7 is a side elevational and cross-sectional view, partially diagrammatic, illustrating one form of lens mold assembly for use in molding a plastic lens with, for example the lens mold of FIG. 6.
Figure 8:
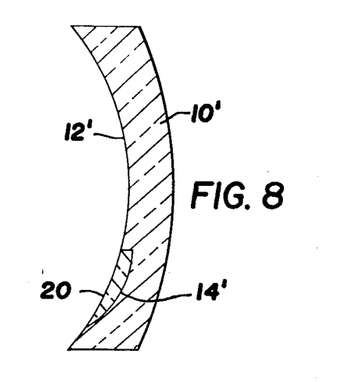
FIG. 8 is a cross-sectional view similar to FIG. 5 of a lens mold half prior to grinding of an intermediate surface having a curvature complementary to the curvature of an intermediate field of vision in a lens.
Figure 9:
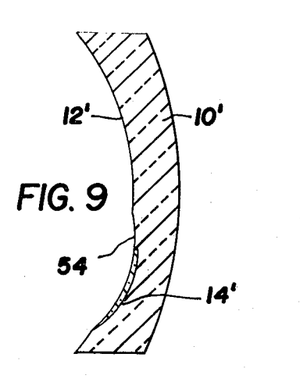
FIG. 9 is a cross-sectional view of the lens mold of FIG. 8 showing the complementary intermediate vision curvature.
Figure 10:
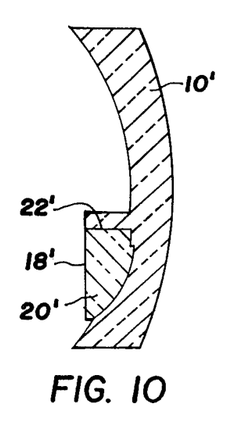
FIG. 10 is a cross-sectional view of the lens mold of FIG. 9 after fusion of a second two part segment.
Figure 11:
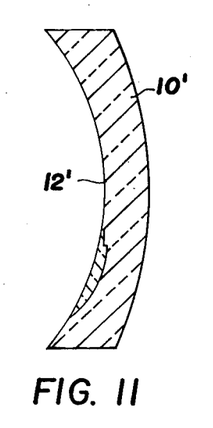
FIG. 11 is a cross-sectional view of the lens mold of FIG. 10 after grinding of a surface defining a curvature complementary to a distance vision curvature of the lens.
Figure 12:
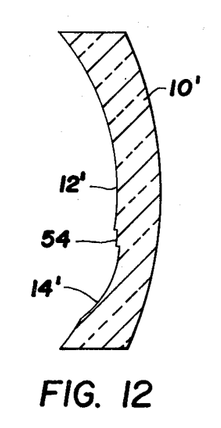
FIG. 12 is a cross-sectional view of the lens mold of FIG. 11 after etching.

After fusion, the mold 10 and segment 18 are ground and polished to the desired radius of curvature to provide a curvature complementary to the curvature of the distance field over surface 12 of mold 10, as shown in FIG. 5. Referring to FIG. 5 it can be seen that at this stage or preparation there is a smooth mold 10 with the preselected complementary near vision correction cavity filled with a glass 20 or 20A for etching. The entire mold is then subjected to an etching treatment, as will hereinafter be more fully described, in order to remove the glass 20 or 20A leaving a completed mold half 10 with a complementary near vision correction cavity 28 with a straight sharp segment line 30, as best seen in FIG. 6, or with a shaped outline such as the one hereinbefore referred to as Panoptic, as more fully described hereinafter. It is desirable to dispose the segment line 30 at a slight angle to the axis of the mold to facilitate removal of a molded lens from the lens mold. The lens mold 10, as shown in FIG. 6, is then ready for molding of the plastic multifocal lenses.

In order to mold the plastic lens a second mold half 32, as shown in FIG. 7, is prepared with a ground and polished convex surface 34. The surface 34 can be finished to a desired prescription curvature or a lesser curvature to allow for subsequent finishing to a variety of prescriptions. The mold halves 10 and 32 are then assembled into a spaced relationship, as shown in FIG. 7, and held apart by suitable means such as a ring 36 with an inwardly projecting rib 38 and held with a spring clamp 40. For simplicity only one clamp 40 is shown, however, it is understood that several may be used. The liquid plastic monomer is introduced into the mold assembly as at inlet 42, shown in FIG. 7. The lens blanks may be made of any of the known optical plastic materials, for example, polymerized methyl methacrylate resin or polymerized methyl diethylene glycol di (allyl carbonate).

The optical plastic material 44 is introduced into the mold cavity at inlet 42 until the mold cavity is filled. The entire assembly is then subjected to the proper hardening and/or curing cycle as dictated by the optical plastic material. When the hardening and/or curing cycle is complete the molds 10 and 32 are removed from the plastic lens blank.

Figure 13:
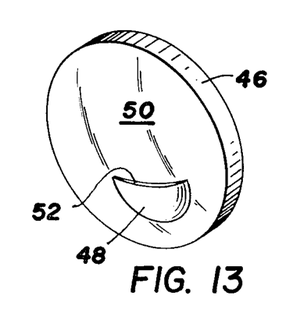
FIG. 13 is a perspective view of an exemplary molded plastic lens showing the multifocal surfaces manufactured using the mold of, for example, FIG. 6.

It must be remembered that during the preparation of the mold halves, assembly of said halves into the mold, casting of the lens, and hardening and/or curing, the mold surfaces must be kept clean and free from all foreign matter such as lint, dust, dirt, etc., in order to yield plastic lenses of the desired optical properties. A completed lens blank 46 molded by the above process is shown in FIG. 13. The lens blank 46 contains the preselected near vision correction segment 48, the surface of which has the curvature 16 molded by the surface 14 of the lens mold 10 and the distance vision surface 50 molded by surface 12 of the lens mold 10.

The above-described mold is used for molding the indicated type of bifocal lens surface. It is to be understood that by varying the contour of the surface 14 of the lens mold 10 and correspondingly, the shape of segment 18, the resulting location and shape of the near vision correction portion of the finished lens may be selectively located and made to any desired configuration.

In view of the above description it can be shown that my method is applicable to the making of molds for casting trifocal lenses. Referring to FIGS. 8 through 12 a suitable concave mold blank 10' is prepared except for grinding and polishing of the distance vision portion and for removal of the preferential etching glass 20. The mold blank 10' is then provided with another recess of intermediate radius of curvature 54, the radius of curvature 54 being between that of the radius of the curvature of surface 12' and surface 14'. The location of the center line of curvature 54 should be slightly below the optical center of the lens mold 10' and above the optical center of surface 14'. Concurrently another two part segment 18', as shown on FIG. 10 composed of a bottom portion 20' of preferential etching glass and a top portion 22' of glass identical in composition to that of mold 10' is prepared by fusion of the two parts. The back surface of segment 18' is ground and polished substantially to a curvature identical to that of surface 54 as hereinbefore described. The segment 54 thus suitably prepared is fused to the mold blank 10'.

Figure 14:
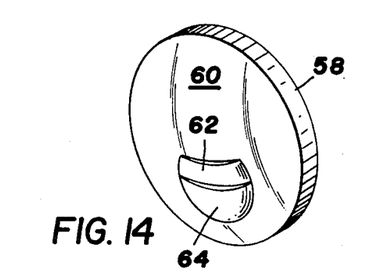
FIG. 14 is a perspective view of an exemplary molded trifocal plastic lens manufactured using the mold of FIG. 12.

After fusion the mold blank 10' and the two part segment 18' are ground and polished to form the complementary curvature to the curvature of the distance field of vision on the mold blank 10'. The entire mold 10' is then subjected to an etching treatment whereby glass 20 and 20' being similar are etched away leaving a lens mold of three radii of curvature, namely 12', 54, and 14'. The mold 10' can then be assembled into a casting fixture as was previously described in reference to FIG. 7 and a lens blank 58, as shown in FIG. 14, produced thereby. The lens blank 58 contains a curved convex surface 60 to accommodate the distance field of vision, a surface 62 to accommodate the intermediate field of vision and a surface 64 to accommodate the near field of vision.

Further understanding of the instant invention will be gained from the following examples.

EXAMPLE I

A 71 millimeter round mold blank of a glass composed of, by weight percent, 68.81 percent $SiO_2$, 10.23 percent $K_2O$, 1.00 percent $Al_2O_3$, 7.34 percent $Na_2O$, 7.82 percent CaO, 0.15 percent $TiO_2$, 0.69 percent $MnO_2$ and 3.96 percent $CeO_2$ was prepared. A suitable concave curve was formed in the lens blank. The concave side of the mold was then countersunk in the area below the center of mold for the desired near vision correction, in this case - 2.00 diopter. A segment 31 millimeters in diameter was made with a bottom portion of a glass composed of, by weight percent, 31.74 percent $SiO_2$, 2.86 percent $K_2O$, 18.63 percent BaO, 4.48 percent ZnO, 6.32 percent $Na_2O$, 5.54 percent $TiO_2$, 7.02 percent $ZrO_2$, 1.53 percent CaO, 6.70 percent SrO, 8.12 percent $La_2O_3$, 6.21 percent $B_2O_3$, 0.60 percent $Al_2O_3$, and 0.25 percent $As_2O_3$ and a top portion of glass similar in composition to that of the mold half described above. The segment was fused with a plane surface between top and bottom glasses. A curvature substantially matching that of the countersink on the mold half was ground and polished on the segment with the exception that prism was introduced on this surface in order to incline the segment-lens interface approximately 10° for easy release of the plastic lens from the mold. The blank and segment were then matched and fused, the segment parting line being 3.0 mm. below the optical center of the lens, suing well-known bifocal glass technology. Subsequent to fusion the mold blank including the segment glass was ground and polished to form the complementary distance field on the mold half. The mold was then placed in a suitable container and covered with a 20 percent solution of 37 percent hydrochloric acid and the container placed in an ultrasonic generator for 3 hours. Periodic inspection was performed and when the preferential etching glass was dissolved (approximately 3 hours) the lens mold was removed from the acid solution and rinsed in clear water. Inspection of the mold revealed a multicolored film in the cavity of the mold which was dissolved in a 1.6 percent solution of "Espray" alkali cleaner a product of Wyandotte Chemical Company, J. B. Ford Division, Wyandotte, Michigan. The finished mold was then rinsed in clean water and dried using an air blast. The other half of the mold was prepared and several lenses of acceptable quality molded.

EXAMPLE II

A 71 millimeter round concave mold glass blank composed of, by weight percent, 66.10 percent $SiO_2$, 9.44 percent $K_2O$, 8.96 percent $Na_2O$, 0.50 percent $Al_2O_3$, 0.50 percent $As_2O_3$, 0.75 percent $Sb_2O_3$, 2.62 percent $Fe_2O_3$, 0.09 percent C, 0.12 percent NiO, 0.01 percent $Co_3O_4$, and 10.91 percent ZnO was prepared. A near vision connection cavity of -2.00 diopters was prepared in the lower half of the mold section as in Example I above. A fused segment, the lower portion composed of a glass of, by weight percent, 32.58 percent $SiO_2$, 18.47 percent BaO, 4.73 percent ZnO, 9.77 percent $Na_2O$, 1.25 percent $K_2O$, 6.95 percent $TiO_2$, 6.53 percent $ZnO_2$, 1.49 percent CaO, 8.77 percent PbO, 9.28 percent $B_2O_3$, 0.036 percent $Co_3O_4$ and 0.144 percent NiO and a top portion composed of a glass similar in composition to the mold glass was prepared. Fusion of the segment and grinding were performed as in Example I. At this point the mold was provided with a −1.00 diopter near vision correction cavity on a center line above the initial −2.00 diopter cavity. Another segment composed of a top half of mold glass and a bottom half of a composition similar to the first segment bottom portion was prepared. A matching curve was ground and polished on this second segment corresponding to the 1.00 diopter cavity. This second segment was fused to the mold as before; however, with the segment parting line 3 mm. below optical center of the mold and above the parting line of the first segment. After fusion the mold blank and segment were ground and polished to form the complementary distance curvature of the mold. The mold was placed in a container and covered with a 20 percent solution of 37 percent HCl and the container placed in an ultrasonic generator. After 4 hours both lower segment glasses were dissolved away leaving a film as before. The film was removed as described in Example I. A suitable mating half of the mold was prepared and several lenses molded. The lenses thus molded were found to be acceptable with +1.00 and +2.00 diopter corrections, for intermediate and near vision.

Figure 15:
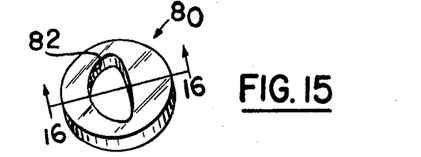
FIG. 15 is a perspective view of a molded fusible segment defining, for example, an opening, having a shape generally referred to as Panoptic.

In FIG. 15 there is illustrated a fusible segment 80 similar in construction to the outer portion 22 A of the two part segment 18 illustrated in FIG. 3A. The application of only an outer segment portion, such as segment 80, without an inner segment of mating size and configuration was hereinbefore briefly discussed. As desired the segment 80 is provided with an opening the outline of which defines a selected size and shape. The opening outline thereby provides for defining the final shape and size of the boundary of a surface on the mold blank, such as the surface defined by the cavity 14, which has a curvature complementary to the curvature of a selected near field of vision for a lens.

The segment 80 generally is formed as a circular flat sided disc and in configuration generally resembles a lateral section cut from a cylinder. The disc segment 80, as illustrated in FIG. 15, defines an opening 82 having a lateral inner wall extending in the direction of the axis of the disc, shaped in a configuration which is generally referred to as Panoptic. The location of the defined opening is preselected and is disposed to provide the best lens surface location for a particular user.

Figure 16:
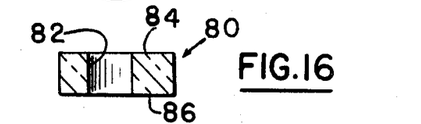
FIG. 16 is a cross-sectional view of the segment of FIG. 15 taken along the plane of line 16—16 in FIG. 15.
Figure 17:
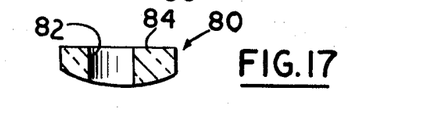
FIG. 17 is a cross-sectional view of the segment of FIG. 16 having a convex surface formed thereon.

IN FIG. 16, a cross-sectional view of the segment 80 is provided and it will be appreciated from this view that the ends 84 and 86 of the cylindrical disc are substantially planar and parallel. Subsequently, a grinding operation is performed on, for example, the surface 86 to generate a convex surface 88, as best seen in FIG. 17, having a curvature which is substantially complementary to, for example, the curvature of the near field of vision cavity 14, illustrated in FIG. 1. As hereinbefore described the length of the radius used to generate the surface 88 is slightly less than the length of the radius used to generate the surface 14 in order to facilitate fusing techniques and to preclude problems arising from the formation of air bubbles or poor adhesion at the fused surfaces.

Figure 18:
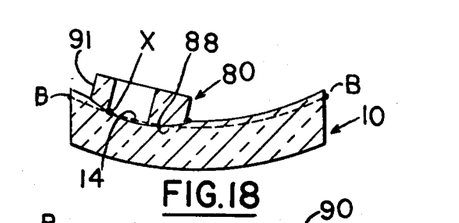
FIG. 18 is a cross-sectional view of the segment as shown in FIG. 17, fused to, for example, the lens mold of FIGS. 1 and 2, at the surface defining the curvature complementary to the curvature of the near field of vision of the lens.

In FIG. 18, the segment 80 has been fused to the mold blank 10, matingly engaging substantially complementary surfaces 88 and 14. In a subsequent step, a surface 90 is generated to define a curvature complementary to curvature of the selected distance field of vision for the lens. The curvature of the surface 90 is defined in FIG. 18 by the broken line B—B which in the cross sectional view of FIG. 18 extends through a point X. The point X is defined as a particular point of intersection of a hereinafter defined line in the lateral wall surface defining the shaped opening, for example, the opening having a shape referred to as Panoptic. The line is defined as extending parallel to the axis of the disc segment 80 and is disposed in the inner wall surface at that location in the inner surface which is least distant from the outer lateral axially extending peripheral surface 91 of the disc segment 80. Point X lies at the intersection of the defined line and the curved surface having a curvature complementary to the curvature of the selected near field of vision, such as the surface defined by the cavity 14. It will be appreciated that the intersection is at one terminus of the defined line.

Figure 19:
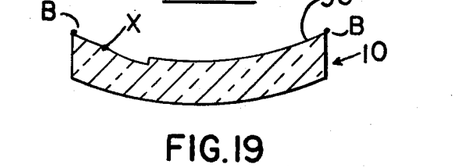
FIG. 19 is a cross-sectional view of the lens mold of FIG. 18 after the grinding of a surface defining the curvature complementary to the curvature of the distance field of vision of the lens.
Figure 20:
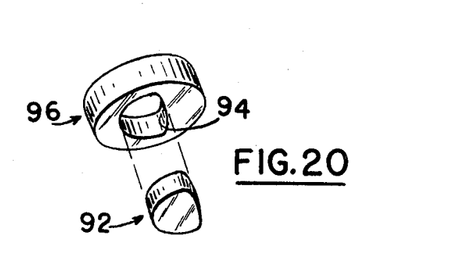
FIG. 20 is a perspective view of an outer segment section similar to that shown in FIG. 15 further including an inner segment section in exploded view, formed, for example, in a shape generally referred to as Panoptic, for fusible matable engagement with the compatible opening defined by the outer segment section.

As seen in FIG. 19, point X, as defined, is a point on the line B—B which defines the curvature complementary to the curvature of the selected distance field of vision. It will be appreciated that in operation, the grinding and polishing of the complementary distance curvature may be stopped before the grinding tool penetrates to the locus of point X or may be continued up to the point X. If grinding is permitted to proceed into the lens mold past the point X the outline shape of the complementary near field will be distorted from the selected and desired shape. In this exemplary case, the selected shape referred to as Panoptic will be violated.

It will be appreciated that in the art of making molds for lenses that a majority of the operations, particularly the grinding operations, are hand operations in which the expertise of the craftsmen is greatly depended upon. In the grinding of the surface having a curvature complementary to the curvature of the distance field of vision in the lens, the expertise of the craftsmen is relied upon not to operate the grinding tool beyond the X point, as hereinbefore defined. One advantage of the present invention over the prior art is that the grinding tool operator has a visible boundary defined by the outline of the shaped opening to which to grind.

In the FIGURE sequence 20–26 essentially the same process as hereinbefore mentioned relating to the illustrations 15–19 is followed except for the fact that there is included in the discussion of FIGS. 20–26 the application of an etchable inner segment section 92, illustrated in a shape referred to as Panoptic. The segment section 92 mateably engages with a compatible opening 94 defined in a generally circularly formed flat sided carrier disc 96, also referred to as an outer segment section.

The carrier disc 96 is, as is the segment 80, formed of a material similar, but preferably identical, in composition to, for example, the glass used to form the mold blank 10. The inner segment section 92 is formed of an etchable glass such as that hereinbefore mentioned for use in forming the bottom portion 20 and the inner segment section 20A of FIGS. 3 and 3A, respectively.

Figure 21:
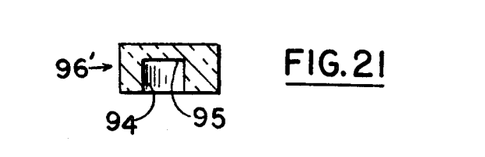
FIG. 21 is a cross-sectional view of the outer segment section of FIG. 20 along the plane of line 21—21 of FIG. 20.
Figure 22:
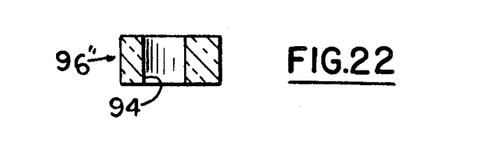
FIG. 22 is a sectional view of a modified outer segment section of FIG. 21 or alternate embodiment similar to the sectional view of the segment in FIG. 16.

In FIGS. 21 and 22 there are illustrated alternate embodiments 96' and 96'', respectively, of the outer segment section 96. Each is shown in cross-sectional view to illustrate in one, the shaped opening 94 and a bottom surface 95 defined by the segment section 96', as best seen in FIG. 21, and in the other, no bottom but the opening 94 passing clear through the outer section 96'' from one flat side to the other, as best seen in FIG. 22. It will be appreciated that either embodiment 96' or 96'' of the outer segment section 96 is for carrying and mating with the inner segment section 92 and being fused therewith. In use, the segment section 96', illustrated in FIG. 21, is fused to the inner segment section 92 at the bottom surface 95, thereby supporting the section 92 and facilitating the fusing of the lateral side of the segment section 92 to the inner wall of the outer segment section 96'.

Figure 23:
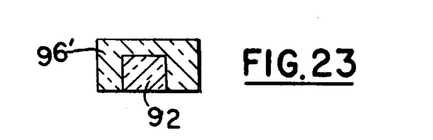
FIG. 23 is a sectional view of the outer segment section of FIG. 21 along the plane of line 21—21 of FIG. 20 in fusible engagement with the inner segment section of FIG. 20.
Figure 24:
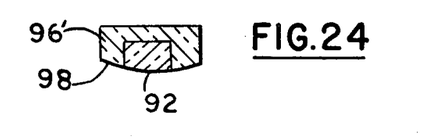
FIG. 24 is the fused two part segment of FIG. 23 comprising inner and outer segment sections and defining on one end of the two part segment a convex surface.

FIG. 23 illustrates, in cross section, the inner segment section 92 fused to the outer segment section 96' in preparation for generation of a convex surface 98, as seen in FIG. 24, having a curvature substantially complementary to the curvature of the near vision cavity 14 of FIG. 1.

Figure 25:
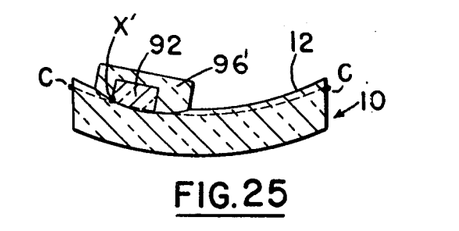
FIG. 25 is a cross-sectional view of the fused two part segment of FIG. 24 and a lens mold blank of, for example, FIGS. 1 or 2 in fused engagement at the convex surface of the two part segment and the surface having a curvature complementary to the near vision curvature of the lens.
Figure 26:
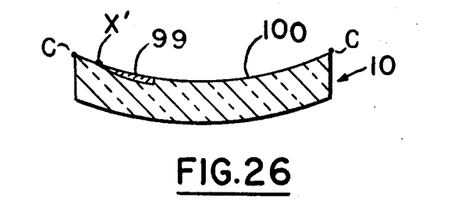
FIG. 26 is a cross-sectional view of the fused two part segment and mold blank of FIG. 25 after grinding to form a surface having a curvature complementary to the distance vision curvature of the lens.

The immediately succeeding manufacturing step comprises fusing the fused two part segment comprising section 96' to matingly engage its convex surface 98 with the surface of the concave cavity 14, as shown in FIG. 25. A generating or grinding tool is then provided to grind the two part segment and the concave surface 12 of the lens mold 10 substantially to a curvature defined by the line C—C, illustrated in FIG. 25, to thereby provide a surface 100 having a curvature complementary to the curvature of the selected distance field of vision for the lens. As hereinbefore mentioned, particularly regarding FIG. 19, generation of the surface 100 is similarly accomplished without passing the grinding tool through the point X' of FIG. 25. Point X' is defined in a manner similar to the method of definition of point X of FIGS. 18 and 19.

Figure 27:
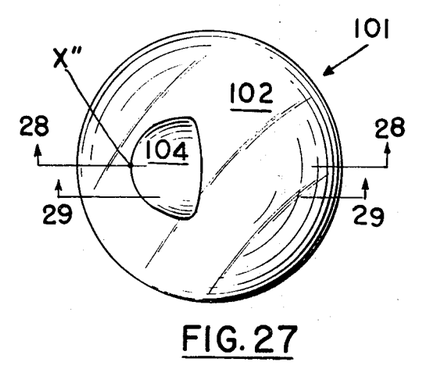
FIG. 27 is a plan view of the lens mold of FIG. 26 after etching of the remaining inner segment section, defining a surface having a curvature complementary to the curvature of the distance field of vision which completely surrounds the periphery of a recessed surface having a shape generally referred to as Panoptic, the recessed surface having a curvature complementary to the curvature of the near field of vision.
Figure 28:
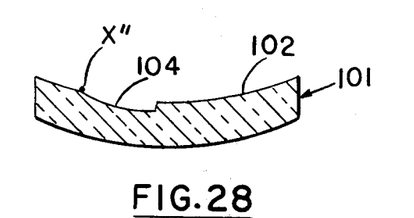
FIG. 28 is a cross-sectional view of the lens mold of FIG. 27 as viewed along the plane of line 28—28 of FIG. 27.

After etching of a portion 99 of glass of the inner segment section 92 which remains after the preceding mentioned grinding operation, a mold 101 is provided for use in molding a bifocal lens and comprises complementary distance vision surface 102 and complementary near vision surface 104, as best seen in the plan view of FIG. 27. As illustrated, the surface 102 completely surrounds the periphery of the surface 104 and the surfaces 102 and 104 share one common point X'', as best seen in the cross-sectional view in FIG. 28.

Figure 29:
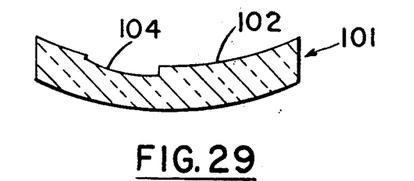
FIG. 29 is a cross-sectional view of the lens mold of FIG. 27 along the plane of line 29—29 of FIG. 27.

As hereinbefore mentioned the surfaces 102 and 104 are generated to share no more than one common point. For clarity the cross sectional view of FIG. 29 is provided to illustrate that generally a substantially lateral wall exists between the complementary distance vision and complementary near vision surfaces 102 and 104, respectively. As hereinbefore described it may be advantageous to include prism or draft in the lateral wall extending between the surfaces 102 and 104 in order to facilitate manufacturing techniques.

Figure 30:
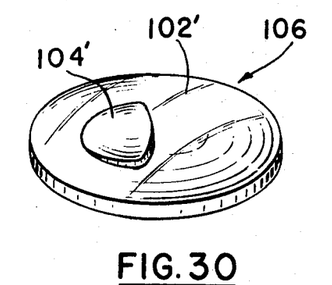
FIG. 30 is a perspective view of a molded lens having a convex surface defining the curvature for the distance field of vision surrounding the periphery of a convex surface defining the curvature for the near field of vision.

FIG. 30 illustrates a completed lens 106 having surfaces 104' and 104' of different focal length with a substantially vertical wall of varying height extending between the surface. It will be appreciated that the wall height may diminish to no measurable height at one point, but only if at the time of generation in the lens mold 101 of the surface 102 having a curvature complementary to the curvature of the distance field of vision of the lens, the generating tool penetrates to the locus of the defined, for example, point X''.

From the foregoing it is evident that I have provided an improved method of making molds for the production of multifocal ophthalmic lenses and lens blanks whereby the production of the molds with a surface containing multiple curvatures can be produced in a simplified manner and to precise tolerances. It is further evident that the mold produced by my improved method contains multiple curves and configurations controlled to precise tolerance levels.

While I have used the term molding in describing the making of lenses and lens blanks by my process I intend to encompass the term casting by which term the molding process is sometimes referred.

Although only certain forms of the present invention are shown and described herein in detail other forms are possible and changes may be made without departing from the spirit and scope of the invention as defined in the following claims.

I claim:

1. A method of making a mold face for molding an ophthalmic lens defining multifocal first and second ophthalmic surfaces, each ophthalmic surface of the lens being of predetermined curvature for differing fields of vision, the first ophthalmic surface of the lens having a peripheral outline configuration which is other than completely circular, the outline configuration defining a portion of a continuous lens wall extending from the first ophthalmic surface of the lens to the second ophthalmic surface of the lens, wherein the mold face has first and second concave mold surfaces and a continuous mold wall extending from the second mold surface to intersect the first mold surface at a continuous line for defining the other than completely circular peripheral outline configuration of the first ophthalmic surface of the lens, each concave mold surface having a curvature identical to the predetermined curvature of each, respective, multifocal first and second ophthalmic surface of the lens, comprising the steps of:

forming a mold blank;

grinding and polishing the mold blank to a curvature identical to the first predetermined curvature of one field of vision for the lens to thereby form the first concave mold surface on the mold blank;

forming a hole shaped segment of a first material to define a hole by forming a continuous inner mold wall having the other than completely circular outline configuration;

forming a filler section of a material different than the material of the hole-shaped segment to define a continuous outer wall of substantially the same configuration and size as the formed continuous inner mold wall of the hole-shaped segment;

forming a disc by adhering the filler section at its continuous outer wall to the hole-shaped segment at its continuous inner mold wall;

grinding and polishing a convex surface on the formed disc to a curvature identical to the curvature of the first concave mold surface ground and polished on the mold blank;

adhering the disc at the ground and polished convex surface of the disc to the mold blank at the first concave mold surface;

grinding and polishing the combined mold blank and disc to a curvature identical to the second predetermined curvature of another field of vision for the lens by grinding and polishing so as not to intersect the continuous line defined by the intersection of the continuous mold wall with the first concave mold surface on the mold blank, the continuous line being defined after the adhering of the convex surface of the ground and polished disc to the mold blank, the grinding and polishing of the mold blank and the disc thereby forming the second concave mold surface on the mold blank; and removing the filler section from the combined disc and mold blank to expose the first concave mold surface to thereby completely form the mold face defining the first and second concave mold surfaces having respective curvatures identical to the predetermined curvatures for the lens for differing fields of vision, the formed continuous inner mold wall extending between the first and second concave mold surfaces and intersecting the first mold surface at the continuous line for defining the other than completely circular peripheral outline configuration of the first ophthalmic surface of the lens.

2. The method of making a mold face as defined in claim 1, wherein the disc for adhering to the first concave mold surface of the mold blank is formed by fusing the hole shaped segment and the filler section together.

3. The method of making a mold face as defined in claim 1, wherein the disc is adhered to the first concave mold surface of the mold blank by fusing.

4. The method of making a mold face as defined in claim 1, wherein the filler section is removed by chemically attacking its material composition.

5. The method of making a mold face as defined in claim 1, wherein the filler section is removed by mechanically and chemically attacking its material composition.

6. The method of making a mold face as defined in claim 1, wherein the continuous mold wall is formed to define a D-shaped curve.

7. A method of making a mold face for molding an ophthalmic lens defining multifocal first and second ophthalmic surfaces, each ophthalmic surface of the lens being of predetermined curvature for differing fields of vision, the first ophthalmic surface of the lens having a boundary outline configuration which is other than completely circular, the outline configuration defining a portion of a continuous lens wall extending from the first ophthalmic surface of the lens to the second ophthalmic surface of the lens, wherein the mold face has first and second concave mold surfaces and a continuous mold wall extending from the second mold surface to intersect the first mold surface at a continuous line for defining the other than completely circular boundary outline configuration of the first ophthalmic surface of the lens, each concave mold surface having a curvature identical to the predetermined curvature of each, respective, multifocal first and second ophthalmic surface of the lens, comprising the steps of:

forming a mold blank;

grinding and polishing the mold blank to a curvature identical to the first predetermined curvature of one field of vision for the lens to thereby form the first concave mold surface on the mold blank;

forming a hole shaped disc to define a hole by forming a continuous inner mold wall having the other than completely circular boundary outline at least at one portion of the inner mold wall;

grinding and polishing a convex surface on the formed disc to a curvature identical to the curvature of the first concave mold surface ground and polished on the mold blank;

adhering the disc at the ground and polished convex surface of the disc to the mold blank at the first concave mold surface; and grinding and polishing the combined mold blank and disc to a curvature identical to the second predetermined curvature of another field of vision for the lens to provide the second concave mold surface as one continuous uniform concave surface comprising the disc and the mold blank by grinding and polishing in order that no point on the second concave mold surface is common with any point on the first concave mold surface, to thereby completely form the mold face with the first concave mold surface set apart from the second concave mold surface by the continuous mold wall extending from the second concave mold surface to intersect the first concave mold surface at the continuous line for defining the other than completely circular boundary outline of the first ophthalmic surface of the lens.

8. The method of making the mold face as defined in claim 7, wherein grinding and polishing the second concave mold surface in the disc and the mold blank to the curvature identical to the second predetermined ophthalmic curvature of said another field of vision for the lens, further comprises:

grinding and polishing the second concave mold surface to a surface level whereat substantially only one point on the first concave mold surface, that point disposed at the continuous line for defining the other than completely circular boundary outline of the first ophthalmic surface of the lens, comprises a point on the second concave surface.

9. A method of making a mold face for molding an ophthalmic lens defining multifocal first, second, and third ophthalmic surfaces, each ophthalmic surface of the lens being of predetermined curvature for differing fields of vision, the first ophthalmic surface of the lens having a peripheral outline configuration which is other than completely circular, the outline configuration defining a portion of a continuous lens wall extending at least in part from the first ophthalmic surface of the lens to the second ophthalmic surface of the lens and extending at least in part to the third ophthalmic surface of the lens, the second ophthalmic surface of the lens having a peripheral outline configuration which is other than completely circular defining a portion of the continuous wall extending at least in part from the second ophthalmic surface of the lens to the third ophthalmic surface of the lens, wherein the mold face has first, second and third concave mold surfaces and a continuous mold wall extending from the third mold surface to intersect the first and second mold surfaces at portions of continuous lines for defining the other than completely circular peripheral outline configurations of the first and second ophthalmic surfaces of the lens, each concave mold surface having a curvature identical to the predetermined curvature of each, respective, multifocal first, second and third ophthalmic surface of the lens, comprising the steps of:

forming a mold blank;

grinding and polishing the mold blank to a curvature identical to the first predetermined curvature of one field of vision for the lens to thereby form the first concave mold surface on the mold blank;

forming a first hole-shaped segment of a first material to define a hole by forming a continuous inner mold wall having an other than completely circular outline configuration;

forming a first filler section of a material different than the material of the first hole-shaped segment to define a continuous outer wall of substantially the same configuration and size as the formed continuous inner mold wall of the first hole-shaped segment;

forming a first disc by adhering the first filler section at its continuous outer wall to the first hole-shaped segment at its continuous inner mold wall;

grinding and polishing a convex surface on the formed first disc to a curvature identical to the curvature of the first concave mold surface ground and polished on the mold blank;

adhering the first disc at the ground and polished convex surface of the first disc to the mold blank at the first concave mold surface;

grinding and polishing the combined mold blank and first disc to a curvature identical to the second predetermined curvature of another field of vision for the lens by grinding and polishing so as not to intersect the continuous line defined by the intersection of the continuous mold wall of the first hole shaped segment with the first concave mold surface on the mold blank, the continuous line being defined after the adhering of the convex surface of the ground and polished first disc to the mold blank at the first concave mold surface, the grinding and polishing of the mold blank and the first disc thereby forming the second concave mold surface on the combined mold blank and first disc;

forming a second hole-shaped segment of the first material to define a hole by forming a continuous inner mold wall having an other than completely circular outline configuration;

forming a second filler section of a material different than the material of the second hole-shaped segment to define a continuous outer wall of substantially the same configuration and size as the formed continuous inner mold wall of the second hole-shaped segment;

forming a second disc by adhering the second filler section at its continuous outer wall to the second hole-shaped segment at its continuous inner mold wall;

grinding and polishing a convex surface on the formed second disc to a curvature identical to the curvature of the second concave mold surface ground and polished on the mold blank and first disc;

adhering the second disc at the ground and polished convex surface of the second disc to the mold blank at the second concave mold surface;

grinding and polishing the combined mold blank and first and second discs to a curvature identical to the third predetermined curvature of another field of vision for the lens by grinding and polishing so as not to intersect the continuous line defined by the intersection of the continuous mold wall of the second hole-shaped segment with the second concave mold surface on the mold blank, the continuous line being defined after the adhering of the convex surface of the ground and polished second disc to the mold blank at the second concave mold surface, the grinding and polishing of the mold blank and the first and second discs thereby forming the third concave mold surface on the mold blank; and removing the first and second filler sections from the combined first and second discs and mold blank to expose the first and second concave mold surfaces to thereby completely form the mold face defining the first, second and third concave mold surfaces having respective curvatures identical to the predetermined curvatures for the lens for differing fields of vision, the formed continuous inner mold walls extending between the first, second and third concave mold surfaces and intersecting the first and second mold surfaces at the respective continuous lines for defining the other than completely circular peripheral outline configurations of the first and second ophthalmic surfaces of the lens.

* * * * *